UNITED STATES PATENT OFFICE.

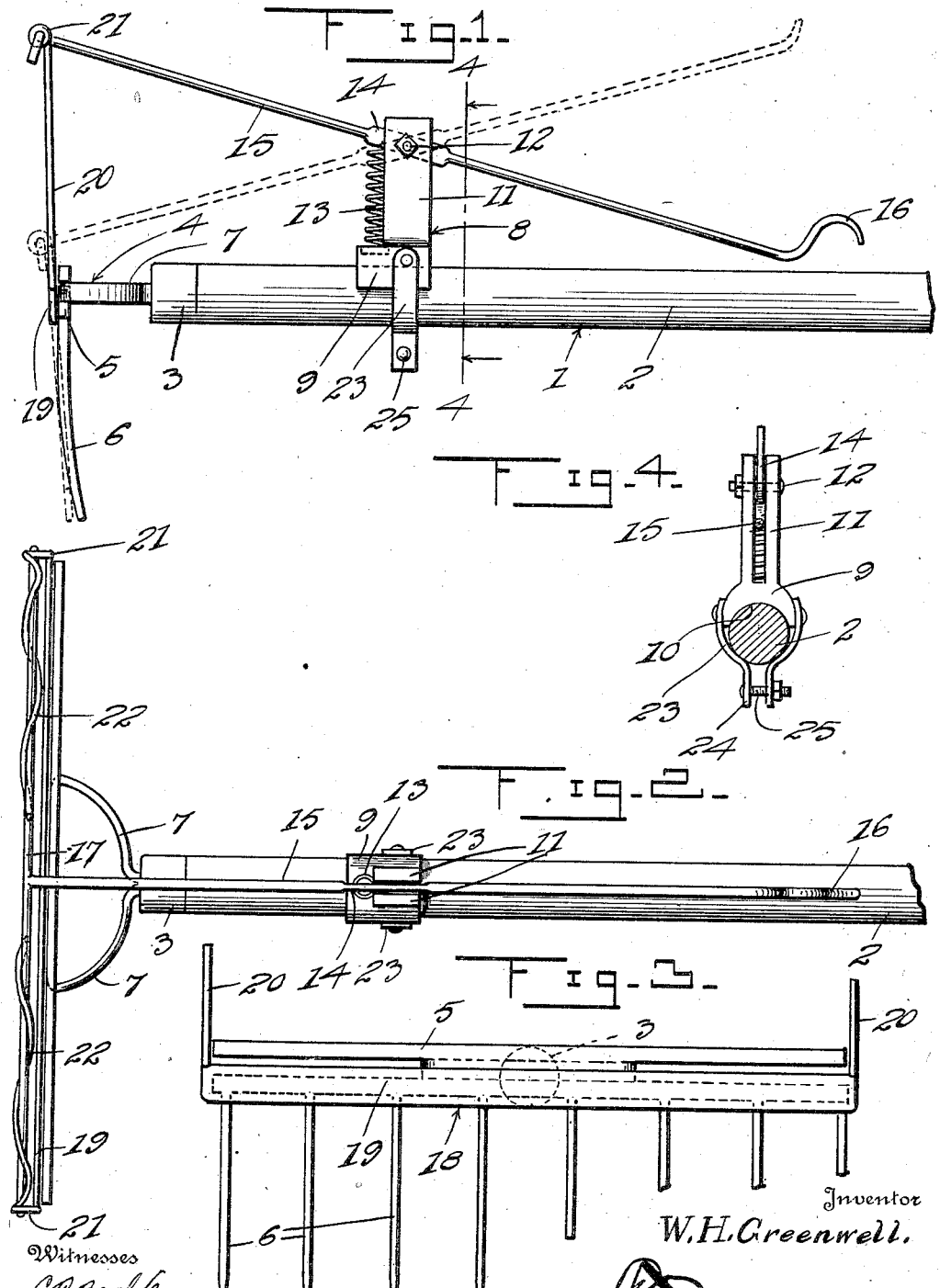
W. H. GREENWELL.
CLEANING ATTACHMENT FOR RAKES.
APPLICATION FILED MAR. 26, 1915.
1,182,167. Patented May 9, 1916.

WILLIAM H. GREENWELL, OF CLOVERPORT, KENTUCKY.

CLEANING ATTACHMENT FOR RAKES.

1,182,167.
Specification of Letters Patent.
Patented May 9, 1916.

Application filed March 26, 1915. Serial No. 17,188.

*To all whom it may concern:*

Be it known that I, WILLIAM H. GREENWELL, a citizen of the United States, residing at Cloverport, in the county of Breckinridge and State of Kentucky, have invented certain new and useful Improvements in Cleaning Attachments for Rakes; and I do hereby declare the following to be a full, clear, and exact description of the invention, such as will enable others skilled in the art to which it appertains to make and use the same.

This invention relates to improvements in cleaning attachments for rakes and has for its principal object to provide a device which may be easily and quickly attached to a rake of the ordinary construction without in any way altering the same.

Another object of the invention is to provide a device which is interchangeable and may be easily and quickly attached to one rake or removed therefrom and placed on another.

Still another object of the invention is to provide a novel means for supporting the stripping bar and operating lever of the device.

With these and other objects in view, the invention consists in the novel combination and arrangement of parts which will be fully set forth in the following specification and accompanying drawings, in which, Figure 1 is a fragmentary side view in elevation of a rake showing this improved cleaner attached thereto, Fig. 2 is a top plan view of Fig. 1, Fig. 3 is a fragmentary front view in elevation of this improved cleaner, and Fig. 4 is a sectional view taken on line 4—4 of Fig. 1.

Referring to the drawings the numeral 1 designates as an entirety a rake of the usual construction comprising the handle 2 which is provided at its forward end with the ferrule 3.

The rake head designated generally by the numeral 4 is shown attached to the ferrule and comprises a strip of metal 5 which is formed with the teeth 6 and provided with the rearwardly extending arms 7 which are bent parallel and extend into the rake handle.

The cleaning attachment designated generally by the numeral 8 comprises a base block 9 which is provided with the arcuate under surface 10 which surface is of a size sufficient to fit the curvature of the rake handle. Extending upwardly from the body 9 are the parallel extensions 11 which are formed near their upper ends with suitable apertures for the reception of the bolt 12 which acts as a pivot on which the lever carrying the stripping bar is pivotally mounted. The body 9 extends forwardly from the arms 11 as shown in the drawing in Fig. 1 and is recessed to receive the lower end of the coiled spring 13, the use of which will appear as the description proceeds.

Pivoted to the bolt 12 and extending between the upward extensions 11 is the flat portion 14 of the operating lever 15, the rear end of which terminates in a finger hold 16 and the forward end of said lever is provided with the cross piece 17 which carries the stripping bar as will be more fully hereinafter described.

The stripping bar hereinbefore referred to is designed generally by the numeral 18 and comprises the bar 19 having formed at each end the upward extension 20 which projects upwardly and have their upper ends wound about the bar 17 as at 21. These ends are continued and twisted around the bar toward its center as at 22 and it will thus be seen that the stripping bar 18 will be held in operating position at all times.

The upper end of the coiled spring 13 abuts the under side of the flat portion 4 of the operating rod 15 and this spring being of the compression type will normally hold the operating rod and stripping bar in the position illustrated in Fig. 1 by the full lines.

Secured to the body 9 on the exterior thereof are suitable clamping elements 23 provided with the downwardly extending ears 24 through which the clamping bolts 25 extend. This clamping bolt is provided with the usual nut and it will be evident that when the device is attached to the rake of the ordinary type the clamping elements 23 coöperate with the body 9 in surrounding the rake handle and upon tightening the nut on the bolt 25 it will be evident that the cleaning device will be normally held in place due to the frictional engagement of the arcuate face of the body 9 with the rake handle as well as the frictional engagement of the inner faces of the clamping elements with said handle.

It will be evident from the foregoing that in use when it is desired to force trash from the ends of the rake teeth, the finger hold 16 of the operating rod 15 is raised as shown by the dotted lines in Fig. 1 and this will cause the stripping bar 18 to descend toward the ends of the rake teeth and thereby force any trash therefrom. In this way it will be evident that the teeth of a rake may be readily cleaned without inconvenience to the user and as soon as the trash is removed the spring 13 will return the cleaner to its normal raised position thus leaving the rake in condition for use.

While in the foregoing there has been shown and described the preferred embodiment of this invention, it is to be understood that such changes may be made in the combination and arrangement of parts as will fall within the spirit and scope of the appended claim.

What is claimed is:—

A rake cleaner of the class described including the combination with a rake head having a handle attached thereto, said rake cleaner comprising a stripping bar adapted to fit up over the teeth of the rake head, a link connected to the central portion of the stripping bar and extending upwardly therefrom, a base block, said base block comprising a body the under surface of which is concaved to conform to the configuration of a handle, a pair of arms secured to the upper face of said body and extending upwardly therefrom, said arms provided adjacent their upper terminals with openings, the block being also provided in its upper face with a recess adjacent the arms, a pair of ears formed on opposite sides of said block and depending downwardly therefrom, means secured to the lower terminals of said ears for firmly clamping the block in position upon the rake handle, a lever having a slot portion centrally of its ends, one end of said lever being curved and its opposite end terminating into a loop, said looped end of the lever being pivotally connected to the upper terminal of the link of the stripping bar, the slot portion of said lever pivotally connected between the arms of the base block and its opposite end acting as a handle, a coil spring resting in the recess on the upper face of the block and connected to the central portion of said lever, said spring adapted to hold the stripping bar up in engagement with the rake head.

In testimony whereof I affix my signature in presence of two witnesses.

WILLIAM H. GREENWELL.

Witnesses:
ALLEN BLACK,
L. E. E. MOADE.

Copies of this patent may be obtained for five cents each, by addressing the "Commissioner of Patents, Washington, D. C."